Dec. 15, 1970 A. B. COHEN ET AL 3,547,730
MACHINE FOR MAKING RESIST IMAGES
Filed Dec. 16, 1966 4 Sheets-Sheet 1

INVENTORS
ABRAHAM BERNARD COHEN
ROBERT BERNARD HEIART

BY Lynn Barratt Morris
ATTORNEY

MACHINE FOR MAKING RESIST IMAGES

INVENTORS
ABRAHAM BERNARD COHEN
ROBERT BERNARD HEIART

BY Lynn Barratt Morris
ATTORNEY

INVENTORS
ABRAHAM BERNARD COHEN
ROBERT BERNARD HEIART
BY Lynn Barratt Morris
ATTORNEY Dec. 15, 1970 A. B. COHEN ET AL 3,547,730

MACHINE FOR MAKING RESIST IMAGES

Filed Dec. 16, 1966 4 Sheets-Sheet 4

INVENTORS
ABRAHAM BERNARD COHEN
ROBERT BERNARD HEIART

BY Lynn Barratt Morris
ATTORNEY

United States Patent Office 3,547,730
Patented Dec. 15, 1970

3,547,730
MACHINE FOR MAKING RESIST IMAGES
Abraham Bernard Cohen, Springfield, and Robert Bernard Heiart, Middletown, N.J., assignors to E. I. du Pont de Nemours and Company, Wilmington, Del., a corporation of Delaware
Filed Dec. 16, 1966, Ser. No. 602,291
Int. Cl. C23f *1/02*
U.S. Cl. 156—345 12 Claims

ABSTRACT OF THE DISCLOSURE

A machine for making resist images having separate means for feeding sheet or plate articles in sequence, for receiving and laminating the articles to a photosensitive layer on a flexible support, for feeding the layer and support, for conveying the laminae and exposing the same, and for separating the support from the remaining laminae.

SUMMARY OF THE INVENTION

Figure 1:
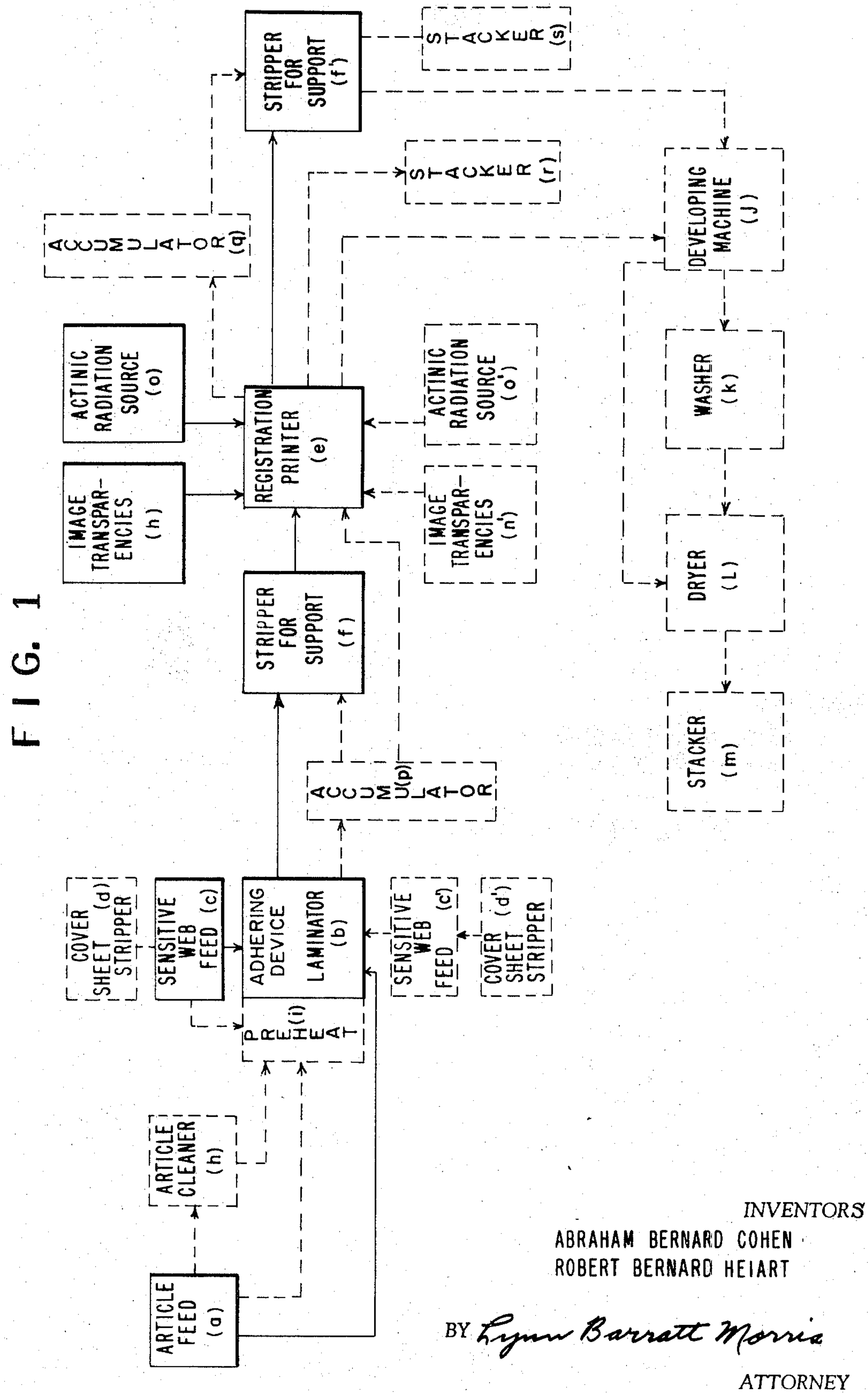

The integrated machine for preparing, automatically, resist images on shaped articles, e.g., etchable sheets or plates, in a continuous or semicontinuous manner, comprises (a) means for feeding the shaped articles in sequence,
(b) means for receiving said articles and laminating them to the surface of a layer of substantially dry, solid, uniformly photosensitive composition which forms soluble and insoluble areas upon imagewise exposure, the other surface of which has low to moderate adhesion to a flexible sheet support,
(c) means for feeding said layer to means (b),
(d) means for conveying the laminated articles with the associated layer and support,
(e) means for exposing, imagewise, (e.g., through an image transparency, e.g., a process negative) to actinic radiation, the layer of photosensitive composition on the sheet or plate units,
(f) means for separating the flexible support from the lamina of photosensitive composition and, if necessary,
(g) means for removing any protective sheet from the photosensitive surface.

Means (f) may be prior or subsequent to imagewise exposure to actinic radiation.

The machine is preferably provided with sheet or plate accumulator means which are located after means (b) and after means (e) so that if there is any delay or variation in the imagewise exposure step, the automatic sequence of operation will continue.

In a further aspect of the invention the machine can be provided with means (h) cleaning the surface of the shaped articles and means (i) for preheating the latter prior to the means for receiving and laminating the latter.

In a still further aspect of the invention which provides a novel, integrated machine, there is provided (j) means for removing the photosensitive material in the appropriate areas (which results in bare etchable surface areas of the sheet or plate),
(k) means for washing said areas,
(l) means for drying the sheets or plates, and
(m) means for receiving, e.g., a stacker for the final plates.

It is an object of this invention to provide simple and dependable machines embodying the means described above. Other objects will be apparent from the following more detailed description.

BACKGROUND OF THE INVENTION

It has been known to prepare printed circuits, chemically machined parts, etched articles, etc. by applying photoinsolubilizable material to the surface of articles, e.g., metal plated circuit boards, and to prepare photoresists on said articles by exposure, imagewise, to actinic radiation followed by treatment with a solvent to remove the unexposed material and further to etch or otherwise modify the surface of articles carrying a photoresist image. Machines have been proposed recently to carry out the various steps in a more or less continuous fashion. All such systems, however, have been based on applying the photoinsolubilizable materials in liquid form, with attendant problems in solidifying the liquid before the subsequent steps can be carried out. Further, the articles must be handled throughout the process as separate entities and conveyed from one work station to another by complicated equipment involving complex timing cycles.

Recently it has been proposed, in the aforesaid applications, Celeste, Ser. No. 477,016, Aug. 3, 1965 (abandoned), but subject matter first refiled as continuation-in-part Ser. No. 759,217, Sept. 11, 1968, U.S. Pat. 3,469,982, Sept. 30, 1969, and Ser. No. 567,799, July 7, 1966, to carry out a process of forming photoresists in which the photoinsolubilizable material is carried as a dry coating or web on a temporary support material and applied to the articles by adhering them in a substantially dry manner, e.g., by laminating them to the coating by heat and/or pressure. The proposed new process makes possible a machine which can adhere the articles consecutively to the supported web of the photosensitive material and carry out a number of steps in the process as web-fed apparatus, greatly simplifying the entire operation. The present invention comprises an integrated machine for adhering articles to a supported web of the photosensitive material forming soluble and insoluble image areas upon imagewise exposure and transporting them along with the web at least to an exposure station where they are subjected to actinic radiation.

DESCRIPTION OF THE INVENTION

Figure 2:
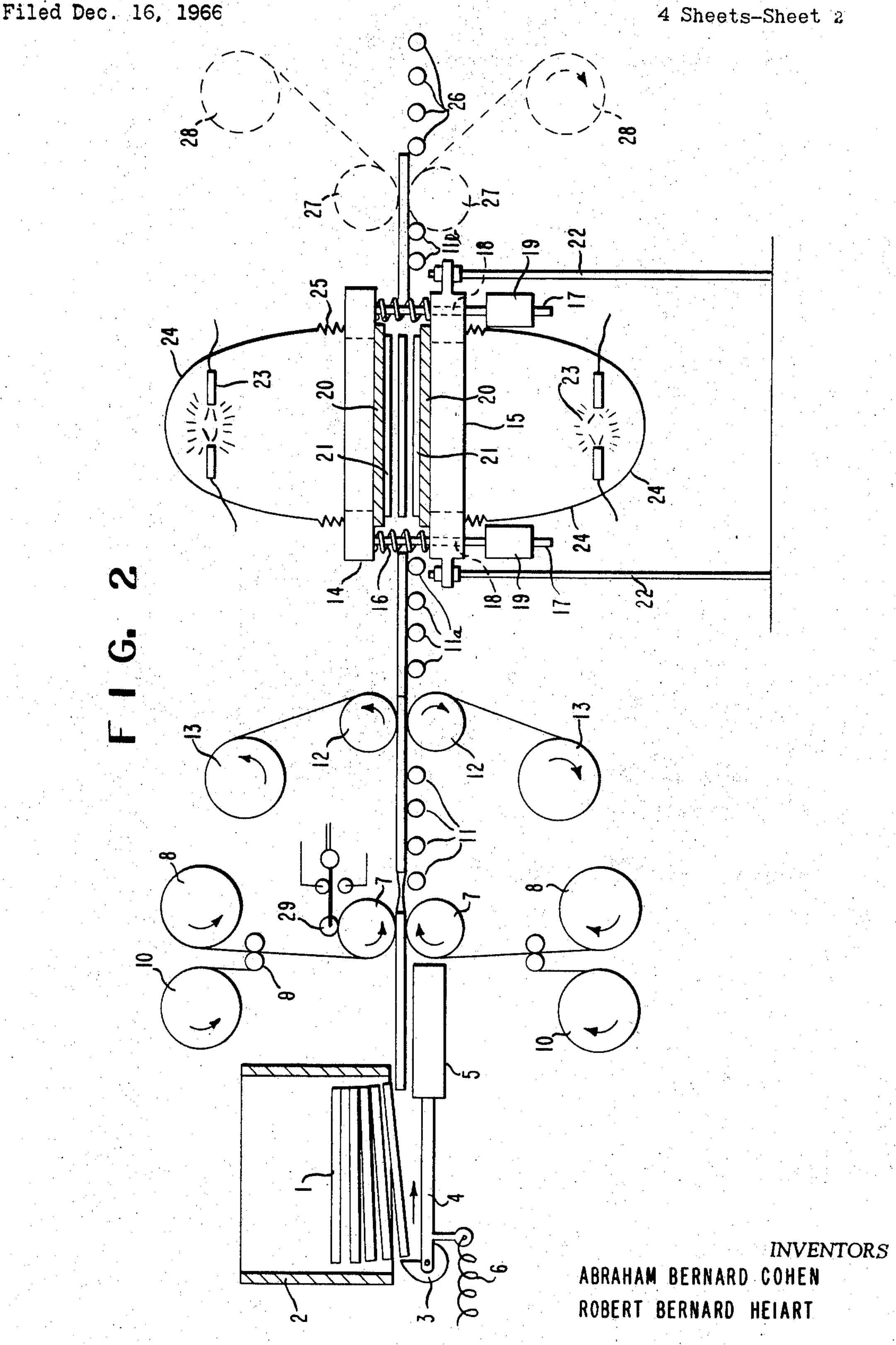
Figure 3:
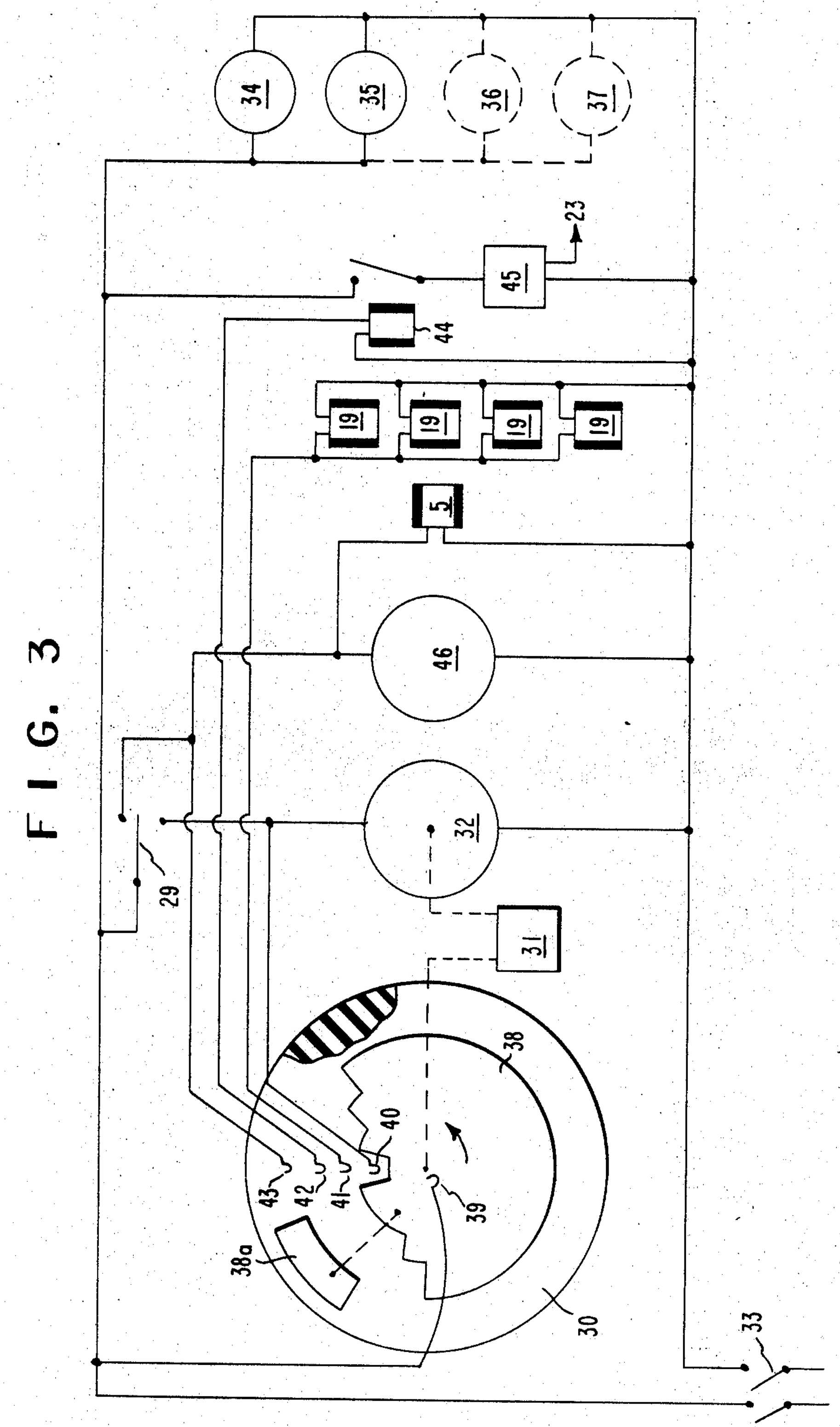
Figures 4, 5:
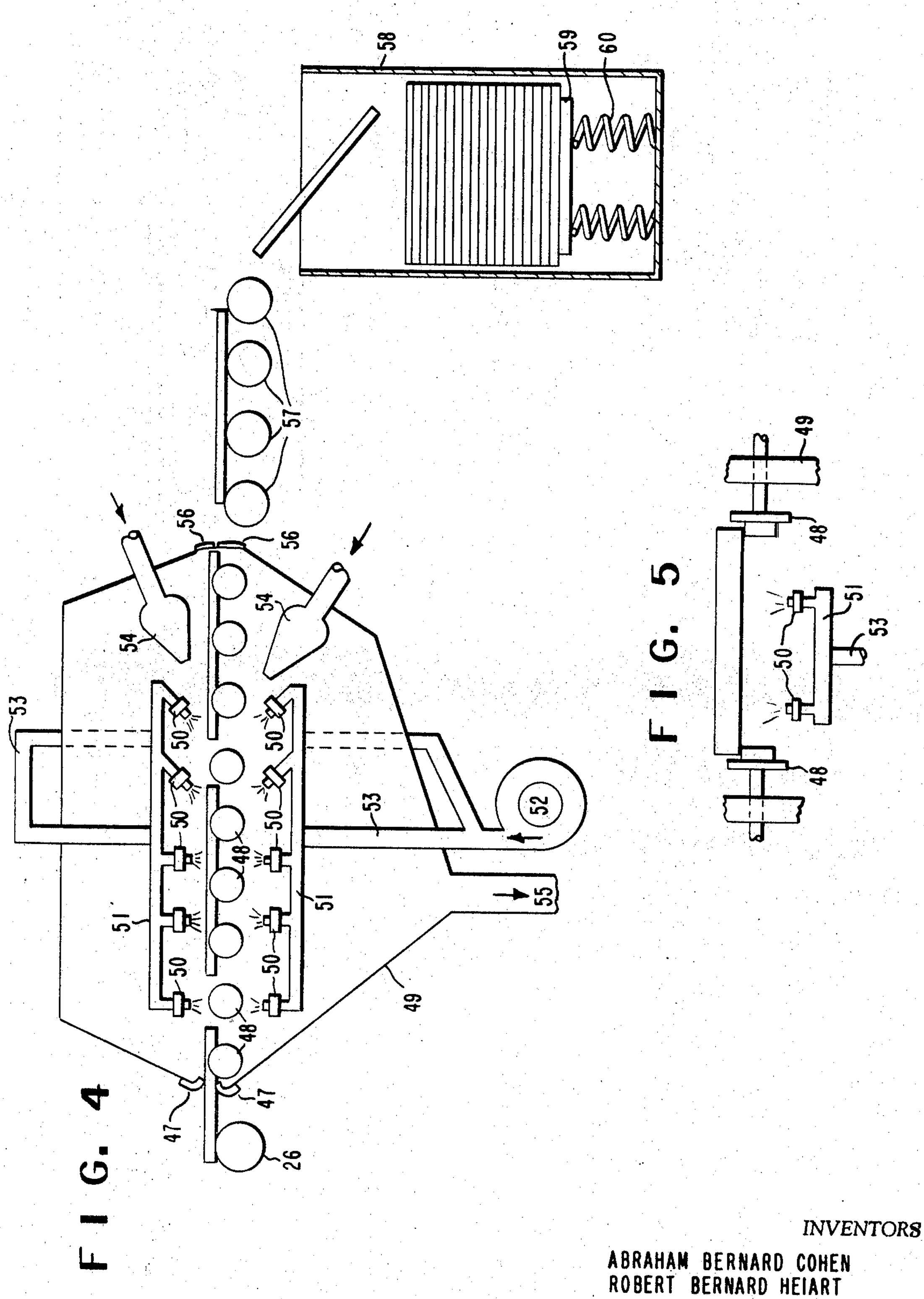

The machine of the present invention may be described in general terms with respect to both its simplest and more complex embodiments by reference to the attached drawings which constitute part of this application. In these drawings FIG. 1 is a flow sheet showing the various parts of the machine of the invention, FIG. 2 is an elevation with parts in section and in dotted outline of a machine of the invention, FIG. 3 is a diagram of a timer, circuit, and associated parts for the machine, FIG. 4 is a sectional view of a developer unit for the machine, and FIG. 5 is an end view of the spray unit taken along line 5—5 of FIG. 4.

Referring to the drawings, and more particularly to FIG. 1, this figure shows, in schematic form, a diagram of essential features of the machine in solid lines and optional features of more complex embodiments in dotted lines. Essentially, the machine consists of an article feed means *a* which takes the articles from a supply thereof and conveys them to an adhering device *b* where they are brought into contact with a substantially dry web of photosensitive material which is fed from sensitive web feed *c* to adhering device *b*. For example, a series of copper plated, glass fiber laminate boards are fed from a hopper to a conveyor belt which carries them to a set of heated laminating rolls where they are laminated by heat and pressure to the surface of a web of dry photopolymerizable material carried by a polyethylene terephthalate temporary support film which is drawn from a supply roll. (Such a web and support is described in Example I of Celeste, U.S. Ser. No. 477,016.) After each board is laminated to the web, it is transported to the registration printer *e* where it is exposed in register with an image transparency *n* to actinic radiation from source *o*. Alternatively, the support film may be stripped by stripper *f* from the web of photopolymerizable material as it and associated boards enter the registration printer or, if the support is transparent to the actinic radiation, the support may be left adhered to the photopolymerizable material and exposure to the image may be accomplished through the support which is subsequently stripped off at stripper *f'*.

In addition to the essential features described above, optional forms of the machine may include any of the following:

- A cleaning device *h* of conventional design to scour, rinse, brighten or otherwise prepare the articles for adherence to the photosensitive web,
- A preheater *i* through which the articles and/or the sensitive web may be fed before they are fed to the laminating or other adhering device,
- A cover sheet stripper *d* for removal of a protective cover sheet from the surface of photosensitive material before feeding it from *c* to *b* or *i* when employing elements having such structure (as in Example I of U.S. Ser. No. 477,016),
- An accumulator *p* between the laminator *b* and stripper *f* or registration printer *e* to permit lamination to take place continuously while registration printing is carried out intermittently,
- An accumulator *q* between registration printer *e* and stripper *f'* to permit the registration printer to operate intermittently while stripping at *f* is continuous,
- A stacker *r* for storing a supply of individual plates after stripping at *f* and printing at *e*,
- A stacker *s* for storing a supply of plates after printing at *e* and stripping at *f'*,
- A developing machine *j* for removing soluble material in a solvent to leave a resist image in the insoluble areas of the plates. The developing machine takes plates after the exposure and stripping steps are complete and is fed from either *f'* or *e*, depending on the location of the stripper,
- A washer *k* which may be used to subject the plates to an aqueous rinse before drying,
- A dryer *l* to remove either solvent for *j* or water from *k*, and
- A stacker *m* to store completed plates.

In one embodiment of the invention, plates or similar articles may be sensitized and exposed on both sides. In this embodiment, duplicate web feed *c'*, cover sheet stripper *g'*, image transparency *n'*, and actinic light source *o'*, are provided. Further strippers *f* or *f'* are then constructed to remove supports from both sides of the articles.

A specific machine of the invention for applying photoinsolubilizable material to both sides of sheets or plates, e.g., circuit boards, and exposing the laminae to image-bearing transparencies is shown in FIG. 2 where selected dimensions have been exaggerated to facilitate understanding. In this machine, a supply of circuit boards 1 are stored in supply bin 2 which has a slotted bottom (not shown). Pawl 3 pivotally mounted on rod 4 extends through the slot in the bottom of bin 2 and engages the end of the bottommost board. When solenoid 5 is actuated, rod 4 extends return spring 6 and pawl 3 forces a circuit board into the nip of heated laminating rolls 7 where it is laminated between surfaces of photoinsolubilizable web, carried on flexible supports drawn from supply rolls 8. Laminating rolls 7 can be spring-loaded to urge them toward each other by springs (not shown). Before entering the nip of the laminating rolls, protective sheets may be stripped from the surfaces of the photoinsolubilizable web by stripper rolls 9 and wound on wind-up mandrels 10. The sandwich of boards between two supports is pulled over idler rollers 11 by winding the supports on mandrels 13 while stripping the supports from the photoinsolubilizable web over stripper rolls 12. The movement of each board from the stripper rolls 12 brings it into abutting relation to the preceding board and pushes it over a second set of idler rollers **11*a* which, in turn, forces the preceding board into an exposure unit. The exposure unit has two rectangular apertured frames 14 and 15 normally held apart by four springs 16 surrounding pull rods 17 rigidly fixed to the upper frame 14 at each of its four corners and passing through corresponding holes 18 in bottom frame 15. Pull rods 17 are actuated in opposition to springs 16 by solenoids 19 to bring frames 14 and 15 toward one another. Frames 14 and 15 have mounted thereon transparent pressure plates 20 to which image-bearing transparencies 21 are attached by any suitable means, e.g., by pressure-sensitive tapes at the periphery of the transparencies, by an adhesive, etc. Exact registrtaion of the image transparencies 21 with the boards 1 can be obtained by having suitable registration pins mounted on frames 14 and interfitting with holes or notches in frame 15** and prepunching the boards and transparencies accordingly. Such means for registration are common in photoprinting and are not shown.

In order to allow the small lateral movement of frames 14 and 15 necessary for precise registration of image transparencies and boards, the frame assembly can be supported by flexible rods 22.

When the image-bearing transparency or transparencies are brought into contact with the board to be exposed, exposure is carried out by activating radiation sources, e.g., carbon arcs 23, that are disposed in reflective hoods 24 mounted to move independently of frames 14 and 15 while attached thereto with a bellows 25. As explained later, exposure is intermittent but is synchronized with the laminating rolls 7 and wind-up mandrels 13. After exposure, the boards are fed onto a third set of idler rolls **11*b* and, finally, to a set of driven conveyor rolls 26, for movement to a storage station or to a developing machine unit. If the flexible support for photoinsolubilizable web is transparent to actinic radiation, the web may be left on the boards until after exposure and then stripped off by stripper rolls 27 and wound up on alternate mandrels 28**.

Synchronization of the entire machine is readily controlled by a sensing device 29 in contact with one of the laminating rolls 7. Such a device can detect or read the end of each board as the rolls 7 "bottom" and actuate a timing sequence governing other operations of the machine.

The sequence of operations and driving means of the machine will now be described with reference to FIGS. 2 and 3. At the start of the operation, the exposure time is set, depending upon the photographic characteristics of the particular sensitive web, by adjusting the rate of rotation of timing disc 30 by means of variable speed transmission 31 driven by constant speed motor 32. Timing disc 30 is in the position shown in FIG. 3 at the beginning of each cycle. At the same time, sensing switch 29 is in the "down" position indicating the absence of a board in the nip between laminating rolls 7. When electric current is applied through master switch 33, torque motors 34 and 35 driving mandrels 13 (or alternatively torque motors 36 and 37 driving mandrels 28) apply tension to the support film wrapped therearound. At the same time, the constant speed timing motor 32 is actuated through the sensing switch 29. As the timing disc rotates, segments 38 and **38*a* (connected to the power line through brush 39) sequentially open and close circuits through brushes 40, 41, 42 and 43. (In the position shown no circuits are activated by timing disc 30**.)

The sequence is as follows:

(a) Brush 40 locks motor 32 on for the duration of one complete cycle.

(b) Brush 41 actuates solenoids 19, closing frames 14 and 18.

(c) Brush 42 actuates lamp relay 44 to activate arcs 23 through control 45.

(d) After the predetermined exposure time, brush 42 deactuates relay 44, thereby deactivating arcs 23.

(e) Brush 41 deactivates solenoids 19, opening frames 14 and 18.

(f) Brush 43 through contact 38*a* starts drive motor 46 and actuates solenoid 5. Solenoid 5 pulls rod 4 in the direction shown, pushing the bottom board 1 by means of pawl 3 into the nip of rolls 7. Simultaneously, drive motor 46 had begun to rotate rolls 7. As board 1 separates rolls 7, sensing switch 29 moves to the "up" position as illustrated in FIG. 2, thereby transferring control of drive motor 46 and solenoid 5 to the sensing switch 29.

(g) Brush 43 opens its circuit to the drive motor 46 and solenoid 5, but these continue to operate under control of sensing switch 29.

(h) Brush 40 stops motor 32, thereby completing one cycle.

The board 1 which has entered the nip of rolls 7 is forwarded by them and laminated to the photoinsolubilizable web carried by support films from supply rolls 8. When the trailing edge of each board passes out of the nip of rolls 7, the rolls "bottom" and sensing switch 29 moves to the "down" position which stops drive motor 46, deactivates solenoid 5 which allows spring 6 to return rod 4 and pawl 3 to its original position in place to engage the next board in the bin 2, and reinitiate the sequence (a) through (h). As shown, when rolls 7 "bottom," they laminate two opposing surfaces of photoinsolubilizable web together and form a double film hinge between and spacing each two boards. However, a single web can be applied in like manner.

Rolls 7 are driven positively by previously mentioned drive motor 46 and draw the sensitive webs from supply rolls 8. On the shafts of supply rolls 8 are sheaves (not shown) for belts which pass around sheaves (not shown) on the shafts of wind-up mandrels 10 to provide slipping drives of the type described in assignee's copending application Heiart, U.S. Ser. No. 525,469 filed Feb. 7, 1966, U.S. Pat. 3,404,057, Oct. 10, 1968. As the webs are pulled off rolls 8, the belts overdrive the wind-up mandrels 10 in a fashion to pull off the cover films attached thereto around stripper rolls 9 and compensate for the diminishing diameter of the supply rolls 8 and the increasing diameter of rolled up cover films wrapped around mandrels 10. Mandrels 13 or, alternatively, mandrels 28, are driven by constant torque motors which are adjusted to wind up the support films whenever rolls 7 are rotating, so that the supported webs and boards can move forward through the machine.

It is obvious that the following conditions must be taken into account in constructing the machine just described:

(A) The distance from rolls 7 to frames 14 and 18 must be chosen so that, when rolls 7 "bottom," the board to be exposed is approximately positioned in register with the frames, and exact positioning can be accomplished as described above.

(B) The tension applied by mandrels 13 or 28 must be less than the restraint imposed on the support films by rolls 7 when in closed position and less than the tension which would break the support films.

Exposed circuit boards from conveyor rolls 26 may be fed to a storage device or directly into a developing machine where the unexposed areas of the photoinsolubilizable material is removed in a solvent. One such developing machine is shown in FIGS. 4 and 5.

With reference now to FIG. 4, exposed, laminated circuit boards from roll 26 are fed between resilient plastic lips 47 onto flanged edge rolls 48 arranged in housing 49. Edge rolls 48 journalled through bearings in the side walls of housing 49 are driven to convey the boards through housing 49 or driven to convey the boards through housing 49 supported only by their lateral edges (see FIG. 5). As the boards travel through the housing, they are subjected to solvent sprays from spray nozzles 50 fed from manifolds 51 under pressure from a reservoir of solvent (not shown) by centrifugal pump 52 through conduits 53. To simplify the drawings, pump 52 is shown mounted below housing 49 with one branch of conduit 53 led around one side of the housing. In an alternative construction, pump 52 could be mounted to one side of the housing with side-entering conduits of approximately equal length. While FIGS. 4 and 5 show a total of 20 spray nozzles, it should be understood that a greater or lesser number could be used in any arrangement to obtain the desired pattern and duration of spray, depending on the width of the boards, the thickness of material to be removed, the speed of travel through the machine, and the rate of solution in the particular solvent used. As shown, it is desirable to position one or more sets of the latter spray nozzles to direct their sprays at an angle in opposition to the direction of movement of the boards. This tends to wash residual partially dissolved material from the surfaces and insure complete removal of the unexposed areas.

After subjection to the spray nozzles, the boards preferably are subjected to a blast of air from air knives 54. This removes remaining solvent from the boards.

The solvent is removed from housing 49 through drain 55 and may be recirculated and filtered, if desired. The boards, now substantially dry, are then driven through resilient, plastic lips 56 onto exit conveyor rollers 57 which may be driven or idler rollers, after which they are directed to a receiving bin 58 having a support table 59 resting on springs 60. Alternatively, rolls 34 may lead to a conventional counterstacker where they are assembled in stacks of any convenient number.

Rolls 26 can be omitted if the exposed boards are to be passed directly into a developer unit. Edge rolls 48 in the developing unit (FIG. 4) should be timed to advance the boards somewhat faster than the rate they pass from the exposure unit.

The machine of FIG. 2 or the detailed machine of FIGS. 2 and 4 can be supported on any suitable floor-frame or can be suitably suspended from the walls or ceiling of a room.

The various parts of the machine described above may be constructed of any suitable materials, e.g., metal, wood, plastic, glass, etc. Preferably, the laminating rollers 7 are of metal covered with a resilient plastic bonded thereto, e.g., polytetrafluoroethylene or silicone rubber. The plastic should be resistant to elevated temperatures when the rolls are heated. Suitable metals include brass, steel, stainless steel alloys, aluminum, etc.

As indicated in FIG. 1 and the accompanying description, many modifications may be made in the machines specifically described with reference to FIGS. 2 and 4 without departing from the spirit and scope of the present invention. Thus, a chopper can be added. Also, after the developer unit, the resist sheets or plates can be passed into an etching unit and washed before and after etching. By means of suitable guide channels or arrangements of rollers, the entire assemblies of FIGS. 2 and 4 can be rotated through 90° along the lengthwise axis and the boards fed into the machines and conveyed therethrough in a vertical or edgewise fashion. To do this, the boards in bin 2 can be fed by pushing means, operated mechanically or pneumatically, the mounting arrangement for frames 14 and 15 modified to give them the desired freedom of movement, and drain 55 shifted and a canted chute provided to flip the boards into bin 58 or onto the conveyor of a stacker-counter mechanism.

While the machines of FIGS. 2 and 4 have been described as operating on both sides of the boards, it is obvious that they can be used to process only one side of a board or other article. This can be accomplished easily by merely omitting one of the two sensitized webs from one side of the machine. Alternatively, one can substitute for the sensitized web on one side a plain web or foil of film, paper, metal, etc. to prevent smearing the opposing laminating rolls when they "bottom" and to gain the advantage of enveloping both sides of the articles. Otherwise, the rolls should be arranged so that there is no contact with the sensitized surface at the "bottom" position. For economy, one can also supply switches in the electrical circuits and a valve in one branch of the conduit 53 to deactivate one side of the machine. Alternatively, the machine can be simplified with parts constructed to operate on one surface only of an article.

The machine of FIG. 2 can be operated intermittently during lamination or exposure, or the boards can be forwarded continuously. If lamination or exposure is continuous, it is necessary to separate the intermittent phase from the continuous phase of operation by an accumulator. The simplest form of accumulator would be a free loop or a festoon of several loops depending from rollers or other suitable support means. Where the articles are flat plates or boards, the hinges of supporting film between them would make it possible to accumulate the film and associated articles in an accordian pleat arrangement as they enter, and unfold them as they are withdrawn from the accumulator.

Obvious modifications may be made in the machine of FIG. 4 to include several pump, manifold, and spray nozzle assemblies to apply a plurality of different spray treatments, e.g., a solvent, followed by an aqueous rinse. Also, the boards may be conveyed from housing 49 into a drying or baking oven on a post-exposure unit where additional actinic radiation hardens the image.

The machine of FIG. 2 can be modified to operate in a continuous fashion throughout by running the laminator continuously and modifying the exposure station to bring the boards into registration with a continuous, closed loop of image transparencies which have perforations or notches at the edges for registration with perforations or notches on the boards by means of sprockets, etc. The source of actinic radiation in such case would be situated within the closed loop of image transparencies.

While the machines have been described with particular reference to processing a number of discrete planar articles, it is obvious that a continuous sheet of flexible material could be laminated to at least one sensitive, supported web by merely modifying the feeding means of FIG. 2 to forward the sheet to be treated either intermittently or continuously into the nip of the laminating rolls. Where a continuous sheet is to be treated, the entire machine can be modified to operate in a continuous manner as previously described with reference to a continuous exposing modifications.

The present invention has advantages over prior art devices, including reduction in labor and attendant costs, by eliminating the step of loading and unloading the articles to be treated between lamination and exposure steps; and, if integrated with developing apparatus, between the latter two steps as well. In addition, reduced handling of articles and sensitized supports reduces probability of damage to both during the steps of the process. Integration of the several devices described reduces the space requirements of the operations and improved cleanliness. Automatic registration of articles and image transparencies is facilitated by forwarding the articles while adhered to a web-film structure to at least the exposure device. Additional advantages are obvious from the preceding description.

The machine can be used with many types or photosensitive webs and/or layers including photopolymerizable webs or layers capable of addition polymerization and photocrosslinkable webs or layers of which many specific examples are set forth in the Celeste patent applications referred to above.

In these particular cases, the unexposed areas remain soluble and are removed by the developing step. However, this machine may also be used with photosoluble films where the exposed area becomes soluble and is removed to leave an image on the film. Actually, the basic requirement of the film is that imagewise exposure of the film forms soluble and insoluble areas where further machine processing will remove the soluble areas, leaving an image on the film.

The embodiments of the invention in which an exclusive property or privilege is claimed are defined as follows:

1. A machine for preparing resist images in a continuous manner comprising (a) a member for feeding sheet or plate articles, (b) rollers for receiving said articles and adapted to laminate to them the surface of a layer of substantially dry, solid, uniformly photosensitive composition which forms soluble and insoluble areas upon imagewise exposure, the other surface having low-to-moderate adhesion to a flexible sheet support, (c) supply rolls adapted to feed said photosensitive layer to rollers (b), (d) the machine being adapted to transport therethrough the laminated articles with the associated layer and support, (e) a support member adapted to receive the laminated articles, and an associated source of actinic radiation adapted to expose, imagewise, in sequence, to actinic radiation the layer of photosensitive composition on the sheet or plate articles, and (f) stripping rollers for separating the flexible support from the lamina of photosensitive composition.

2. A machine according to claim 1 having idler rollers useful in transporting resulting laminated articles.

3. A machine according to claim 1 wherein the stripping roller (f) is located before member (e).

4. A machine according to claim 1 wherein the stripping roller (f) is located after member (e).

5. A machine according to claim 1 having (g) a stripping roller for removing any protective sheet from the photopolymerizable surface.

6. A machine according to claim 1 having an accumulator adapted to store and release sheets or plates after one or both members (b) and (e).

7. A machine according to claim 1 having in combination therewith (h) an applicator member adapted to supply a fluid for modifying the surface of the sheets or plates before they are received by rollers (b).

8. A machine according to claim 1 having in combination therewith heating means for rollers (b) and, if desired, (i) heaters for preheating the sheets or plates before they are received by rollers (b).

9 A. machine according to claim 1 wherein rollers (b), rolls (c), stripping rolls (f) and the support member and the source of actinic radiation (e) are provided for opposite surfaces of the articles.

10. A machine according to claim 1 having in combination therewith (j) a spray device adapted to supply fluid for removing the photosensitive material in the areas of the sheet or plate that are soluble after imagewise exposure.

11. A machine according to claim 10 that has in combination therewith (k') a spray device adapted to supply fluid for etching the surface of the article bearing a resist image.

12. A machine according to claim 11 that has in combination therewith (k) a spray device adapted to supply fluid for washing the etched surface areas, (l) a device for drying the resulting sheets or plates, and (m) a receiver for receiving the final processed sheets or plates.

References Cited

UNITED STATES PATENTS 3,307,950 3/1967 Applebaum ---------- 96—83

3,156,563 11/1964 Harrison et al. ---- 156—11X 3,415,699 12/1968 Brown -------------- 156—13

JACOB H. STEINBERG, Primary Examiner

U.S. Cl. X.R.

96—35.1; 156—3, 10, 11, 230, 240, 540, 542